US008958297B1

(12) United States Patent
Miller et al.

(10) Patent No.: US 8,958,297 B1
(45) Date of Patent: *Feb. 17, 2015

(54) DATA NETWORK WITH "PER FLOW" FLOW MONITORING

(75) Inventors: David A. Miller, Swisher, IA (US); Daniel E. Mazuk, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 366 days.

This patent is subject to a terminal disclaimer.

(21) Appl. No.: 13/533,572

(22) Filed: Jun. 26, 2012

(51) Int. Cl.
*H04L 12/815* (2013.01)

(52) U.S. Cl.
USPC .......................................................... 370/235

(58) Field of Classification Search
CPC ........ H04L 47/22; H04L 47/24; H04L 12/569
USPC .............. 370/229, 230, 230.1, 232, 233, 234, 370/235, 351, 389, 395.1, 395.2, 395.21
See application file for complete search history.

(56) References Cited

U.S. PATENT DOCUMENTS

| | | | |
|---|---|---|---|
| 7,675,919 B2 | 3/2010 | Vestal | |
| 7,787,486 B2 | 8/2010 | Vestal | |
| 7,813,277 B2 | 10/2010 | Okholm et al. | |
| 7,929,431 B2 * | 4/2011 | Wilt et al. | 370/229 |
| 7,983,195 B2 | 7/2011 | Andreoletti et al. | |
| 8,078,055 B1 | 12/2011 | Mazuk et al. | |
| 8,190,727 B2 | 5/2012 | Henkel | |
| 2003/0016686 A1 | 1/2003 | Wynne et al. | |
| 2007/0127521 A1 | 6/2007 | Sandell et al. | |
| 2008/0031282 A1 * | 2/2008 | Vestal | 370/498 |
| 2009/0323704 A1 | 12/2009 | Hall et al. | |
| 2010/0195491 A1 * | 8/2010 | Gray et al. | 370/230 |
| 2012/0250694 A1 * | 10/2012 | Hall et al. | 370/400 |

* cited by examiner

*Primary Examiner* — Obaidul Huq
(74) *Attorney, Agent, or Firm* — Angel N. Gerdzhikov; Donna P. Suchy; Daniel M. Barbieri

(57) ABSTRACT

A 'per flow' flow monitor is operatively associated with each ingress port of the switch of the data network, for monitoring the arrival data flow on each flow in defined traffic constraint envelopes containing frames. An eligibility time computation mechanism computes an eligibility time at which arriving frames on each flow will be conformant to the defined traffic envelope to the ingress port given past frame arrivals on that same flow. A holding mechanism holds the arriving frames on each flow until the eligibility time is reached. A release mechanism releases the arriving frames on a flow at the eligibility time. The flow monitor, computation mechanism, holding mechanism, and release mechanism cooperate to provide an 'per flow' traffic shaping function in conformance with delay and delay-jitter bound, frame loss probability, and bandwidth provisioning requirements, thus allowing the switch to enforce the traffic constraint envelope for each flow.

20 Claims, 5 Drawing Sheets

DATA NETWORK WITH "PER FLOW" FLOW MONITORING

BACKGROUND OF THE INVENTION

1. Field of the Invention

The present invention relates generally to avionics systems and more particularly to improved switching systems for Avionics Full-Duplex Switched Ethernet (AFDX) systems.

2. Description of the Related Art

Modern onboard avionics networks serve to provide data transfer between various components of an aircraft. Avionics systems typically have a variety of systems that provide data to processing components of the aircraft or exchange data among one or more components of the aircraft. For example, a variety of avionics modules may gather avionics data (e.g., sensors detecting speed, direction, external temperature, control surface positions, and the like) that is routed by the avionics system via an avionics network to one or more aircraft components such as displays, monitoring circuits, processors, and the like.

In some aircraft systems, the avionics network may be constructed with an Aeronautical Radio Inc. (ARINC) 429 data bus capable of supporting communication between many components. More recently, Ethernet networks have been used in avionic network environments by leveraging Commercial Off-The-Shelf (COTS) technology to increase bandwidth and reduce cost.

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. In an avionics network environment, the Ethernet network typically has different components that subscribe to the avionics network and connect to each other through switches. Each network subscriber can send packets in digital form, at controlled rates, to one or more other subscribers. When a switch receives the packets, the switch determines the destination equipment and directs or switches the packets to such equipment.

Such Ethernet networks may include ARINC-664 based networks. In a switched full-duplex Ethernet type network, the term "full-duplex" refers to sending and receiving packets at the same time on the same link, and the term "switched" refers to the packets being switched in switches on appropriate outputs. However, the ARINC-664 network uses multiple switches and redundant paths to route data, point-to-point or point-to-multipoint across the switches.

Avionics Full-Duplex Switched Ethernet (AFDX) is a data network for safety-critical applications that utilizes dedicated bandwidth while providing deterministic Quality of Service (QoS). AFDX is based on IEEE 802.3 Ethernet technology and utilizes Commercial Off-The-Shelf (COTS) components. AFDX is a specific implementation of ARINC Specification 664 Part 7, a profiled version of an IEEE 802.3 network per parts 1 & 2, which defines how Commercial Off-the-Shelf networking components will be used for future generation Aircraft Data Networks (ADN). The six primary aspects of AFDX include full duplex, redundancy, deterministic, high speed performance, switched and profiled network.

Certain AFDX data networks require synchronous scheduling for proper operation. For example, U.S. Pat. No. 7,675,919, issued to S. C. Vestal, entitled, "End System Scheduling for Switched Networks," discloses a method for scheduling one or more data packet transfers over a computer-based distributed network. The method involves constructing a cyclic schedule from a plurality of data packets, wherein the cyclic schedule is constructed to ensure that each data packet transfer is substantially free of jitter. The method further involves synchronizing the cyclic schedule with at least one periodic processing schedule and transmitting the synchronized data packets as arranged by the cyclic schedule.

U.S. Pat. No. 7,787,486, issued to S. C. Vestal, entitled, "Method and System for Achieving Low Jitter in Real-Time Switched Networks," discloses a method and system for increasing the precision of time synchronization among a plurality of host nodes in a packet-switched network by reducing transmission delay variation in the network. Each host node is provided with a distinct set of transmission times selected from a global schedule in such a way as to avoid concurrent transmission of messages by the plurality of host nodes. The transmission times may be determined as offsets within a global hyperperiod, and each host node carries out transmissions according to predetermined offsets of the respective host node. Transmissions according to offsets may be applied to real-time messages, including time-synchronization messages, hence yielding increased precision of synchronization.

Some networks are designed for asynchronous operation between components. This provides cost savings. With such networks each end system is viewed as having a set of flows where each flow has an expected arrival envelope. It is desired that the number of virtual links (VLs) be maximized for a given level of performance.

In conventional networks, delay-jitter along the propagation path grows exponentially as each flow propagates from switch to switch and as the number of virtual flows grows. As will be disclosed below, with the present invention delay-jitter is eliminated for all but the final switch in an AFDX network. This implies that the delay-jitter experienced for end systems connected to the same switch is nearly the same as for those connected to another switch using an AFDX switching trunk line. Delay-jitter management remains an important issue for avionics systems and it is desired to minimize such delay-jitter.

Circular Dependence occurs when one or more flows have no defined traffic envelope at a given output port. This problem is very easily generated in an aircraft as each function is duplicated for availability. Function X and Y are implemented as X, X', Y and Y' with full interconnectivity provided. In fact circular dependence must be proactively avoided, affecting the routing choices of VLs in the network.

An example of a system for avoiding circular dependence is disclosed in U.S. Pat. No. 7,983,195, issued to Andreoletti, et al., entitled, "Method of Routing Virtual Links in a Frame-Switching Network With Guaranteed Determinism." The '195 patent discloses a method for routing virtual links in a frame switching network including a plurality of source terminals and/or destination of the frames, frame switches being connected together through physical connections, each virtual link being defined, for a point-to-point type, by a path through the network between a source terminal and a destination terminal and, for a multipoint type, by a plurality of paths through the network between a source terminal and a plurality of destination terminals. The method carries out routing of the links while observing a segregation constraint with regard to triplets of consecutive switches belonging to the oriented loops, so as to allow verification of determinism of the network. However, it constrains the flow routing making the process more complex.

As will be disclosed below the present invention addresses four issues relating to the AFDX switching performance and analysis: First, the end-to-end delay bound computation complexity. Second the vulnerability of AFDX to VL routing induced circular dependence. Third, the introduction of delay-jitter at intermediate AFDX switches in the network. Fourth, end systems measures needed to very precisely compute the transmission time of each frame in order to limit the delay-jitter experienced by the flow and the impact on the system. Fifth, the avoidance of having to use static priority packet scheduling.

U.S. Ser. No. 13/533,034, now issued as U.S. Pat. No. 8,817,622, entitled, "DATA NETWORK WITH AGGREGATE FLOW MONITORING," filed concurrently herewith, by the applicants, D. A. Miller and D. E. Mazuk, and assigned to the present assignee, discusses the use of aggregate flow monitoring in a data network for monitoring the aggregate arrival data flow in defined traffic constraint envelopes containing frames. This co-filed patent application is incorporated by reference herein in its entirety.

U.S. Ser. No. 13/533,265, entitled, "DATA NETWORK WITH CONSTRAINED SWITCH TRANSMISSION RATES," filed concurrently herewith, by the applicant, D. A. Miller, and assigned to the present assignee, discusses a data network utilizing packet schedulers for managing the transmission of received data flow. A plurality of effective line rate utilization mechanisms are each associated with a respective packet scheduler for providing the service rate of that packet scheduler. A plurality of switch egress ports transmit the received data flow. Each switch egress port has a defined configured effective transmission rate. Each effective line rate utilization mechanism reduces the utilization rate to the defined configured effective transmission rate. This co-filed patent application is incorporated by reference herein in its entirety.

SUMMARY OF THE INVENTION

In a broad aspect, the present invention is embodied as a data network, including a plurality of end systems; a plurality of line data buses connected to the end systems; and a plurality of switches connected to the line data buses and to other switches via trunk data buses to define a star topology. The switches and end systems are configured to operate asynchronously. Each switch includes a plurality of switch ingress ports for receiving arrival data flows, each arrival data flow having delay and delay-jitter bound requirements, frame loss probability requirements, and bandwidth provisioning requirements. A 'per flow' flow monitor is operatively associated with each switch ingress port for monitoring the arrival data on each flow in defined traffic constraint envelopes containing frames. An eligibility time computation mechanism computes an eligibility time at which arriving frames on each flow will be conformant to the defined traffic constraint envelope given past frame arrivals on that same flow. A holding mechanism holds the arriving frames on each flow until the eligibility time is reached. A release mechanism releases the arriving frames on a flow at the eligibility time. The aggregate flow monitor, the eligibility time computation mechanism, the holding mechanism, and the release mechanism cooperate to provide a 'per flow' traffic shaping function in conformance with the delay and delay-jitter bound requirements, the frame loss probability requirements, and the bandwidth provisioning requirements, thus allowing the switch to enforce the traffic constraint envelope for each flow.

The delay and delay-jitter bound requirements, frame loss probability requirements, and bandwidth provisioning requirements are validated by an analysis tool. These inventive concepts are particularly useful as implemented in an avionics data network, and more particularly for an Avionics Full-Duplex Switched Ethernet (AFDX) network. The aggregate traffic shaping function preferably comprises a token bucket process. The holding mechanism may be implemented by utilizing a frame storage buffer to maintain a sorted queue of frames based on the computed eligibility time.

In another broad aspect, the present invention may be embodied as a method for routing data flow in a data network of a type having a plurality of end systems, a plurality of line data buses connected to the end systems, and a plurality of switches connected to the line data buses and to other switches via trunk data buses to define a star topology, the switches and end systems configured to operate asynchronously. Each switch is, configured to operate by the steps of: a) receiving arrival data flows, via a plurality of switch ingress ports each arrival data flow having delay and delay-jitter bound requirements, frame loss probability requirements, and bandwidth provisioning requirements; b) monitoring the arrival data on each flow in defined traffic constraint envelopes containing frames, utilizing a 'per flow' flow monitor operatively associated with each flow; c) computing an eligibility time at which arriving frames on each flow will be conformant to the defined traffic constraint envelope given past frame arrivals on that same flow, utilizing an eligibility time computation mechanism; d) holding the arriving frames on each flow until the eligibility time is reached utilizing a holding mechanism; and, e) releasing the arriving frames on a flow at the eligibility time utilizing a release mechanism. The 'per flow' flow monitor, the eligibility time computation mechanism, the holding mechanism, and the release mechanism cooperate to provide a 'per flow' traffic shaping function in conformance with the delay and delay-jitter bound requirements, the frame loss probability requirements, and the bandwidth provisioning requirements, thus allowing the switch to enforce the traffic constraint envelope for each flow.

The present invention is particularly advantageous in avionics applications because it increases the utilization capacity of an AFDX Ethernet topology. This could be applicable to future AFDX switch based design approaches. Unlike U.S. Pat. No. 7,675,919, which relates to an end system transmission schedule and U.S. Pat. No. 7,787,486, which relates to establishing coordinated end system transmission schedules for achieving low jitter, the present invention relates to an asynchronous system. This simplifies and reduces the overall cost of the overall system. Unlike U.S. Pat. No. 7,983,195, the present invention does not constrain routing.

Other objects, advantages, and novel features will become apparent from the following detailed description of the invention when considered in conjunction with the accompanying drawings.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
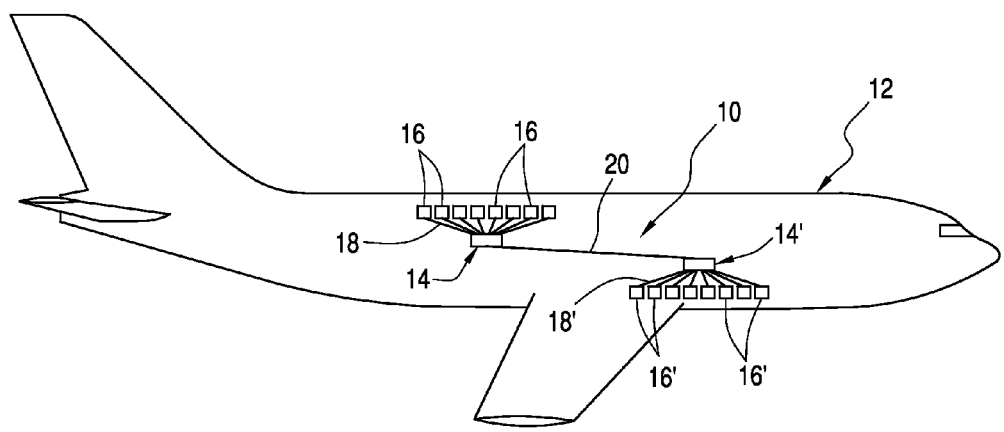
FIG. 1 illustrates an aircraft employing a data network of the present invention.

Referring now to the drawings and the characters of reference marked thereon, FIG. 1 illustrates the data network of the present invention, designated generally as 10, implemented as an avionics data network, more specifically as an AFDX Ethernet network in an aircraft 12. This illustration is greatly simplified and shows only two switches 14, 14' and eight avionics end systems 16, 16' connected to each switch 14, 14'. Actual data networks 10 in an aircraft may support tens and even hundreds of switches 14, 14' and hundreds of end systems 16, 16'. This star topology minimizes wire weight as each end system 16, 16' is connected to a nearby switch 14. Line data buses 18, 18' connect the end systems 16, 16' to the switches 14, 14'. Switches 14, 14' are linked by other switches via trunk data buses 20. As used herein the term "star topology" is defined broadly to refer to a data network in which for at least one switch some portion of data received to multiple ingress ports are transmitted to a common egress port.

Typical end systems 16, 16' may be, for example, sensors, effectors, display systems, computation platforms, radios, data concentrators, audio components, engine controllers, flight control computers, etc.

Figure 2:
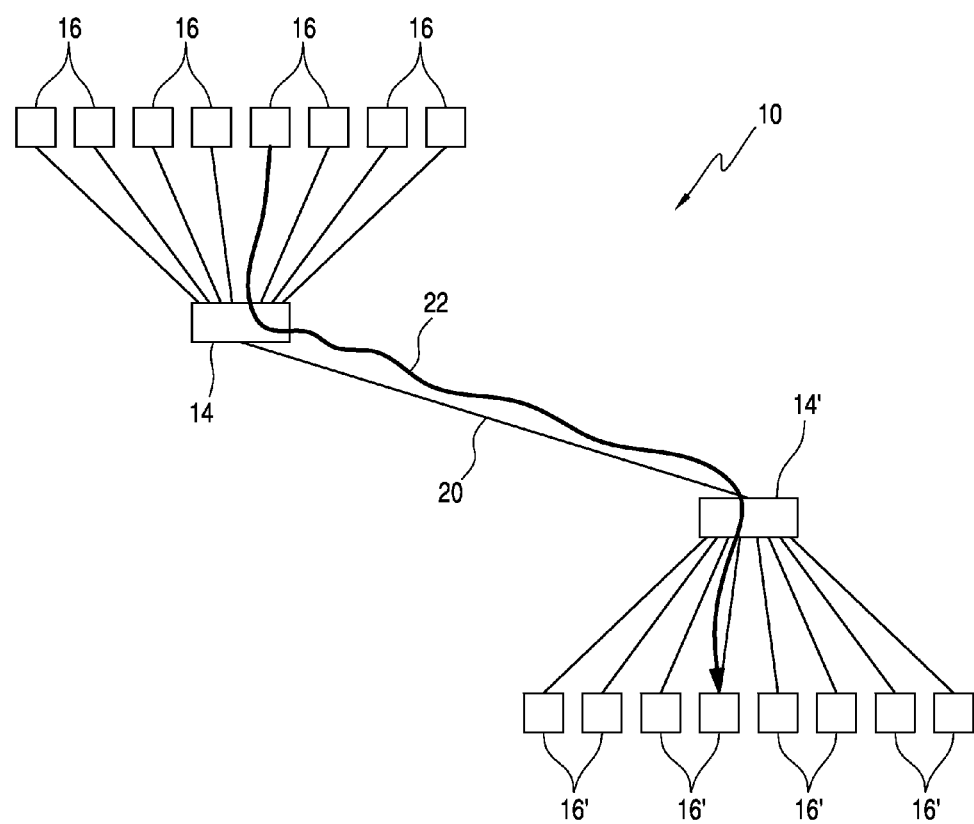
FIG. 2 illustrates the data network of FIG. 1 showing traffic flow supported under the AFDX Ethernet using Virtual Links (VLs).

As can be seen by reference to FIG. 2, flow traffic is supported under AFDX Ethernet using Virtual Links (VLs) 22. Each VL 22 is routed from a source end system 16 to one or more destination end systems 16'. Each VL is provisioned with allocated bandwidth and is characterized with a bounding delay bound from source end system 16 to each destination end system 16'. Contention with other VLs 22 causes delay in the network as a frame may have to wait at each switch egress (output port) for transmission. The switches and end systems are configured to operate asynchronously in their emission behaviors. There is no effort needed to coordinate clock timing.

Figure 3:
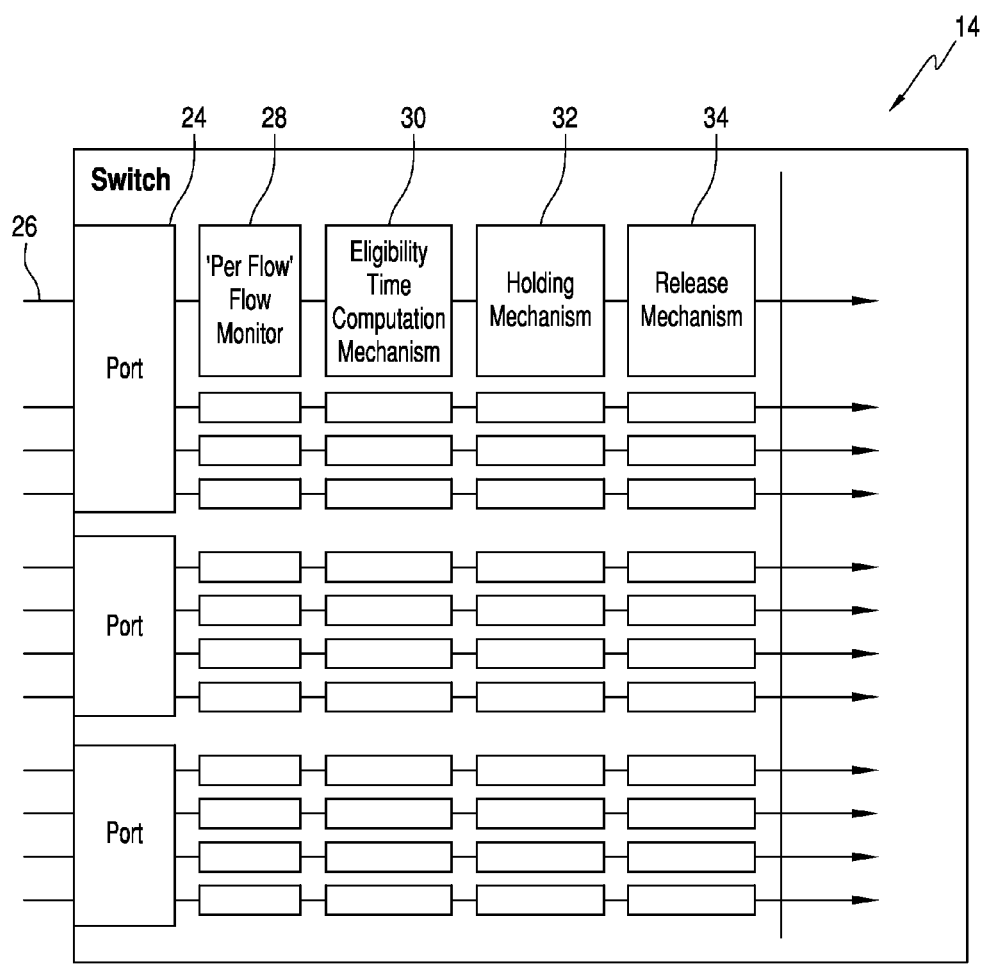
FIG. 3 is a schematic illustration of a switch of the data network of the present invention.

Referring now to FIG. 3, an enlarged schematic illustration of a switch 14 is shown. A plurality of switch ingress ports 24 receive arrival data flow 26 defined in virtual links, each arrival data flow having delay and delay-jitter bound requirements. A 'per flow' flow monitor 28 is operatively associated with each flow for monitoring the arrival data on each flow in defined traffic constraint envelopes containing frames. An eligibility time computation mechanism 30 computes the time at which arriving frames on each flow to an ingress port 24 will be conformant to the defined traffic envelope to that same ingress port 24 given past frame arrivals on that same flow. (This time may be zero when the frame is eligible at arrival time.) This allows optimized analysis of the performance of the switch 14. A holding mechanism 32 holds the arriving frames on each flow to an ingress port 24 until that eligibility time is reached. A release mechanism 34 releases the arriving frames on each flow for forwarding at the eligibility time. The 'per flow' flow monitor 28, the eligibility time computation mechanism 30, the holding mechanism 32, and the release mechanism 34 cooperate to provide a 'per flow' traffic shaping function, thus allowing the switch 14 to enforce the traffic constraint envelope for each ingress port 24. The delay and delay-jitter bound requirements, frame loss probability requirements, and bandwidth provisioning requirements have been validated by an analysis tool. The analysis tool may be, for example, an off-line algorithm that runs on a PC tool for computing bandwidth sufficiency, delay and delay-jitter bounds, and needed buffering. The 'per flow' traffic shaping function preferably comprises a token bucket process. This token bucket process may comprise a plurality of token buckets.

A "flow" is defined herein broadly to refer to a set of frames passing an observation point in the network during a certain time interval, all frames belonging to a particular flow having a set of common properties. The common properties are unique to the bus used to support the arriving frames. For example, when AFDX is used, all frames having a common virtual link ID are considered part of the same flow. For example, when a TDMA bus is used, all frames arriving on a common allocated time slot may be considered part of the same flow.

The switch 14 is preferably embodied as an application specific integrated circuit (ASIC). However, as will be discussed below in more detail hereinafter it may be embodied in other manners known to those skilled in this field.

The 'per flow' flow monitor 28 may be implemented by maintaining a token bucket count for each physical port. At each frame receipt of size x, the 'per flow' flow monitor 28: 1) updates the token bucket count based on the accumulation rate and duration of time since a frame was accepted, and 2) accepts the frame and removes x tokens from the token bucket count when the updated count is greater than x. When multiple token buckets are utilized the actions discussed above are applied for each token bucket and the frame is accepted only when the token bucket count is satisfied for each token bucket.

The eligibility time computation mechanism 30 may be implemented at each frame receipt of size x by computing the time at which the token bucket count will reach the value x. This time will be the frame receipt time when the token bucket count is greater than x, otherwise it will be in the future.

The holding mechanism 32 may be implemented by utilizing a frame storage buffer to maintain a sorted queue of frames based on the computed eligibility time. Maintaining a sorted list of eligibility times insures efficient searching for the next eligibility time in the queue.

The release mechanism 34 may be implemented by forwarding each eligible frame to the configured output ports to be posted for packet scheduling.

The resulting performance of the switch is enhanced as the analysis implied bursting is minimized, sensitivity to the quantity of virtual links used in the AFDX data network is minimized, the buffer capacity requirements to store frames is minimized, and the latency bounds on each virtual link are minimized.

Figure 4A:
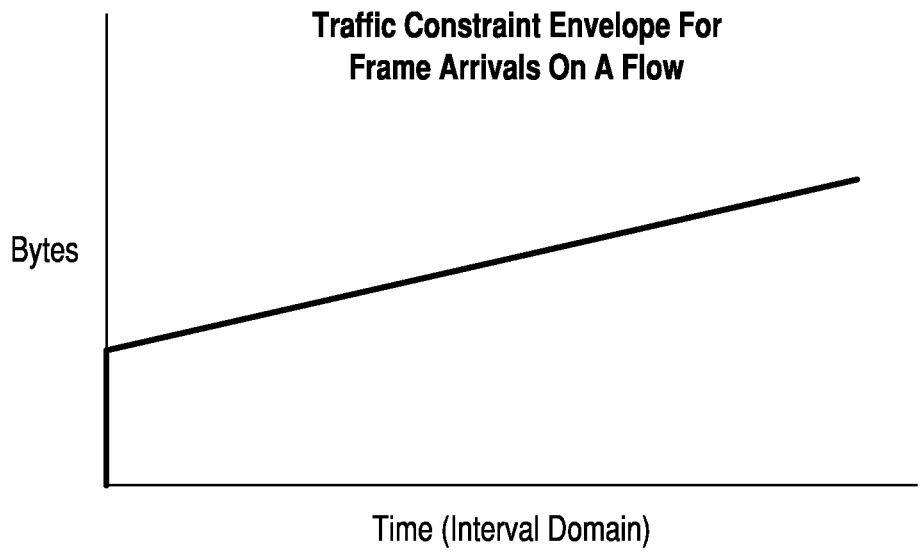
FIG. 4A is an example graph of the traffic constraint envelope 'per flow' flow arrivals for a physical ingress port.
Figure 4B:
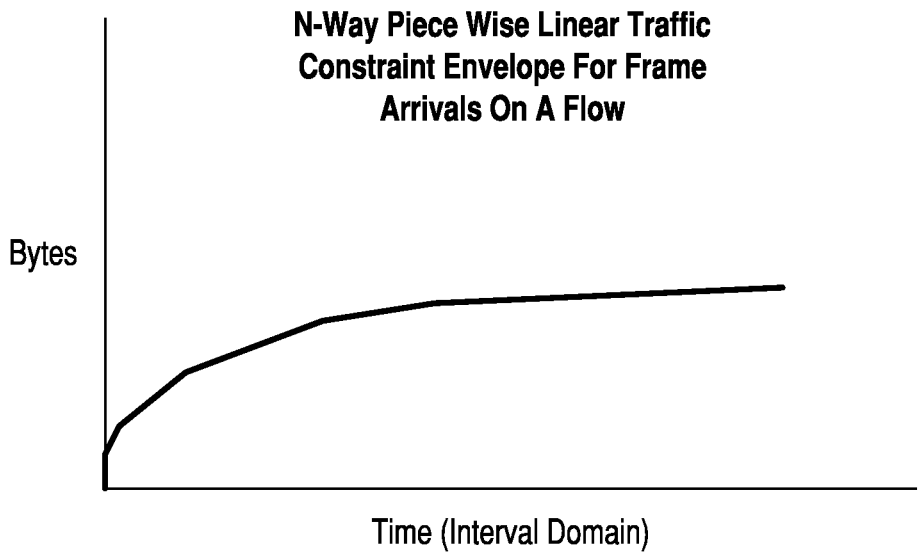
FIG. 4B is an example graph for another ingress port.

Referring now to FIGS. 4A and 4B, example graphs of the traffic constraint envelope 'per flow' flow arrivals for two ingress ports are shown. These diagrams show a traffic constraint envelope established for flow arrivals on a flow. This limits the assumed arrival behavior from the physical receive port for the purposes of analysis of the transmissions from the switch. Each traffic constraint envelope is n-way, non-decreasing, and concave. FIG. 4A shows a two-way piece wise linear traffic constraint envelope with a burst and rate component. FIG. 4B shows a multiple N-way piecewise linear traffic constraint envelope with multiple rate components.

The vertical axis may be in bytes as shown in FIGS. 4A and 4B; or, it may be in frames. The token bucket processes may be implemented in combinations of frames and bytes. For example, it may be implemented as three frame denominated token buckets and three byte denominated token buckets producing two three-way piece-wise linear traffic envelopes.

As discussed above, the present invention introduces per ADFX virtual link (VL) traffic shaping which is performed at the frame receipt at the switch. The AFDX switch is modified from conventional switches to compute an eligibility time (ET) of each received frame, where ET=max(arrival time of this frame, previous ET of the same flow+frame period of this flow). The frame is then held until the ET time before it is submitted to the forwarding output ports for transmission. By holding the frame until the ET time, the original traffic envelope regulated at the source transmitting end system, is restored. This means that the shape of the traffic offered for forwarding on each flow within the AFDX switch is known by definition as it is re-established at the ET time.

The above concepts may be implemented in store and forward switches and/or cut through switches.

'Per flow' traffic shaping applied to each flow should be applied to all flows arriving to each port. When this is performed on all input flows, each flow of the system has better delay performance as the aggregated arrival is less.

Figure 5:
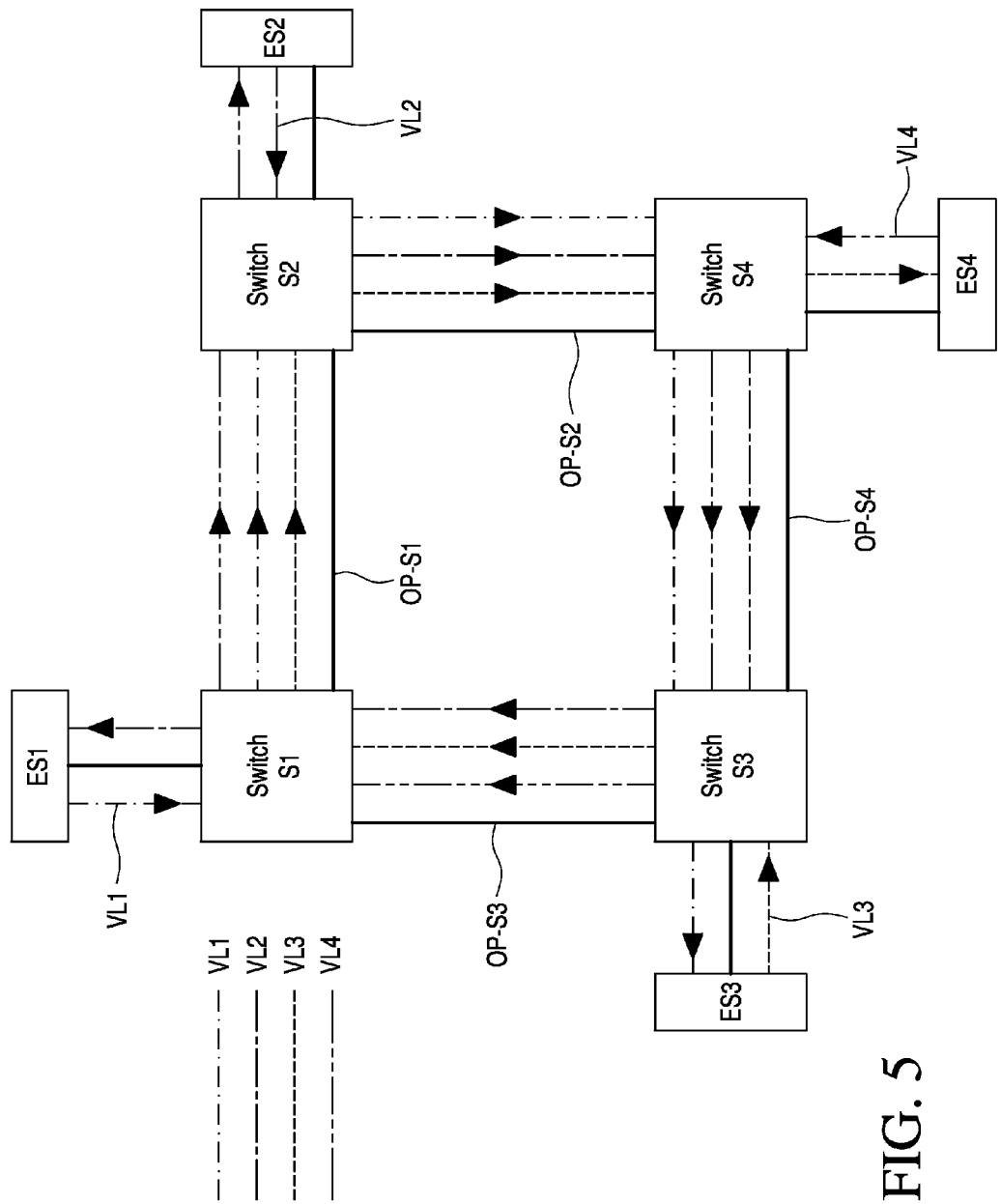
FIG. 5 shows a data network of the present invention illustrating avoiding circular dependency.

FIG. 5 illustrates a simplified AFDX network comprising a loop with four switches S1, S2, S3, S4, to illustrate the applicability of the present invention in eliminating circular dependency. Four end systems ES1, ES2, ES3, ES4, are connected to the switches S1, S2, S3, S4. Each switch has three physical ports, each physical port including an ingress port and an egress port. Four virtual links VL1-VL4 have been routed in the network.

The flow traffic envelope of the egress port OP-S1 of S1 depends on the flow traffic envelope of the egress port OP-S3 of S3 and of that of the VL1. The flow traffic envelope of the egress port OP-S2 of S2 depends on the flow traffic envelope of the egress port OP-S1 of S1 and of that of the VL2. The flow traffic envelope of the egress port OP-S4 of S4 depends on the flow envelope of the egress port OP-S2 of S2 and of that of the VL4. Finally, the flow traffic envelope of the egress port OP-S3 of S3 depends on the flow traffic envelope of the egress port OP-S4 of S4 and of that of the VL3. Thus, at each egress port there exists at least one virtual link with an unknown traffic envelope.

With the circular dependency relationships, the flow envelopes and therefore the latency times cannot be estimated with conventional switches. However, the switches of the present invention resolve this problem. The use of traffic shaping avoids this issue by making the traffic envelope of each flow arriving to each output port scheduler by definition known. When all flows to a packet scheduler is known, the schedulability analysis can be performed avoiding the circular dependence. Since the traffic envelope of each VL at each egress port is known the packet scheduler at each egress port can be analyzed.

The analysis methodology of the AFDX switching network is reduced as the traffic envelope of each flow arriving to each egress port scheduler is by definition known. This allows each switch to be analyzed for schedulability and for buffer requirements independent of the other switches of the network. For example schedulability and buffer sufficiency analysis could be done on switch 1, then 2, then 3, . . . , and finally on the last switch (any sequence is acceptable). Each switch stands alone and is a very simple analysis. The end-to-end delay bound will simply be the required delay bounds of the flow path plus the computed delay bound of the final switch. This greatly reduces the complexity of the analysis tool.

Through the use of this invention, software based end systems can more easily offer data to the AFDX switching network as the data can be offered with much less precision. The existing AFDX switch function requires each connected end system to precisely traffic shape each arriving flow. This is needed to help minimize the aggregation of delay-jitter induced bursting increase at switch egress ports. This can be significant as many VLs are supported (currently thousands in an air transport aircraft). When the switch implements traffic shaping in accordance with this invention, delay-jitter introduced by the connected end system can be accepted and absorbed in the switch operation. The flow traffic accepted and forwarded to the multicast output ports will be delay-jitter free. The switch buffering simply needs to be adjusted to accommodate the delay-jitter the connected device is limited to.

Traffic shaping allows the use of very efficient packet scheduling policies in a network where circular dependencies would commonly occur. When the traffic envelopes are known, packet schedulers using priorities based on age of data are acceptable. An example is EDF (earliest deadline first), which is the most efficient scheduling policy. The EDF packet scheduling policy has the characteristic that if a set of flows are schedulable under any other policy then they are schedulable under EDF. Thus EDF allows for maximal utilization as there is no better alternative policy choice that could have done better. This maximizes transmission capacity utilization. EDF allows the delay bound to be set individually for each flow. This allows each flow, in effect, to be allocated its own priority based on system requirement decomposition. This avoids a real problem of static priority coupling between flows in the system. By using traffic shaping known traffic envelopes are insured. Otherwise resolution of the problem of cyclic dependencies is very difficult with age based priority packet schedulers such as EDF.

It should be noted that the introduction of traffic shaping to the switch does not increase the end-to-end delay bound of the VL flows. This is a proven concept under network calculus analysis. This follows fundamentally as the hold time (H) needed for traffic shaping is equal to the earliest time (E) in transmission from the previous device having delay bound D. The wait time (W) in the previous device, will be equal to D-E, is the actual amount of time frame waited pending transmission. When traffic shaping holds the frame for a time period H=E. The total time from eligibility in the previous device until traffic reshaping completion will be (W)+(H)=(D−E)+(H)=(D−E)+(E)=D which is the delay bound of the previous device. The computation of H at the receive function of the switch is based on traffic envelope monitoring of the VL flow.

Although the inventive concepts herein have been described with respect to avionics applications they may be implemented in a variety of applications where safety motivations require detailed scrutiny beyond customer satisfaction. These include, for example, automotive applications, robotic applications, and medical applications.

Furthermore, although each of the 'per flow' flow monitors has been illustrated as being associated with a single flow it is understood that under certain configurations this association may not be one to one. Generally, this one to one correspondence is desired for fault containment. However, when the emission behavior of multiple flows is coordinated these flows may be associated with a common 'per flow' flow monitor.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:
1. A data network, comprising:
a) a plurality of end systems;
b) a plurality of line data buses connected to said end systems;
c) a plurality of switches connected to said line data buses and to other switches via trunk data buses to define a star topology, said switches and end systems configured to operate asynchronously, each switch comprising:
 i. a plurality of switch ingress ports for receiving arrival data flows, each arrival data flow having delay and delay-jitter bound requirements, frame loss probability requirements, and bandwidth provisioning requirements;
 ii. a 'per flow' flow monitor operatively associated with each said flow into each said switch ingress port for monitoring the arrival data on each flow in defined traffic constraint envelopes containing frames;
 iii. an eligibility time computation mechanism for computing an eligibility time at which arriving frames on each flow will be conformant to said defined traffic constraint envelope given past frame arrivals on that same flow;
 iv. a holding mechanism for holding said arriving frames on each flow until the eligibility time is reached; and,
 v. a release mechanism for releasing the arriving frames on a flow at the eligibility time,
wherein said 'per flow' flow monitor, said eligibility time computation mechanism, said holding mechanism, and said release mechanism cooperate to provide a 'per flow' traffic shaping function in conformance with said delay and delay-jitter bound requirements, said frame loss probability requirements, and said bandwidth provisioning requirements, thus allowing the switch to enforce the traffic constraint envelope for each flow.

2. The data network of claim 1, wherein said delay and delay-jitter bound requirements, frame loss probability requirements, and bandwidth provisioning requirements are validated by an analysis tool.

3. The data network of claim 1, wherein said plurality of switches are connected to said line data buses and to other switches via trunk data buses to define an avionics data network.

4. The data network of claim 1, wherein said plurality of switches are connected to said line data buses and to other switches via trunk data buses to define an Avionics Full-Duplex Switched Ethernet (AFDX).

5. The data network of claim 1, wherein said 'per flow' traffic shaping function comprises a token bucket process.

6. The data network of claim 5, wherein said eligibility time computation mechanism determines the moment in time at which arriving frames will be conformant in accordance with said token bucket process.

7. The data network of claim 1, wherein said 'per flow' traffic shaping function comprises a token bucket process comprising a plurality of token buckets.

8. The data network of claim 1, wherein at each frame receipt of size x, the 'per flow' flow monitor: 1) updates a token bucket count based on the accumulation rate and duration of time since a frame was accepted, and 2) accepts the frame and removes x tokens from the token bucket count when the updated count is greater than x.

9. The data network of claim 1, wherein said eligibility time computation mechanism is implemented at each frame receipt of size x by computing the time at which the token bucket count will reach the value x, this time being the frame receipt time when the token bucket count is greater than x, otherwise it will be in the future.

10. The data network of claim 1, wherein said arrival data flow is measured in bytes, frames, and/or bytes in combination with frames.

11. The data network of claim 1, wherein each switch is analyzed without being dependent on the analysis of any of the other switches.

12. The data network of claim 1, wherein each traffic envelope is shaped to a defined traffic constraint envelope, thus avoiding circular dependence and minimizing the analysis technique.

13. The data network of claim 1, wherein EDF (earliest deadline first) is utilized in the scheduling policies of egress ports of the switch.

14. A switch for a data network of a type having a plurality of end systems, a plurality of line data buses connected to the end systems, and a plurality of switches connected to said line data buses and to other switches via trunk data buses to define a star topology, the switches and end systems configured to operate asynchronously, each switch comprising:
   a) a plurality of switch ingress ports for receiving arrival data flows, each arrival data flow having delay and delay-jitter bound requirements, frame loss probability requirements, and bandwidth provisioning requirements;
   b) a 'per flow' flow monitor operatively associated with each said switch ingress port for monitoring the arrival data flow on each flow in defined traffic constraint envelopes containing frames;
   c) an eligibility time computation mechanism for computing an eligibility time at which arriving frames to an ingress port will be conformant to said defined traffic constraint envelope given past frame arrivals on that same flow;
   d) a holding mechanism for holding said arriving frames to the ingress port until the eligibility time is reached; and,
   e) a release mechanism for releasing the arriving frames on a flow at the eligibility time,
   wherein said 'per flow' flow monitor, said eligibility time computation mechanism, said holding mechanism, and said release mechanism cooperate to provide a 'per flow' traffic shaping function in conformance with said delay and delay-jitter bound requirements, said frame loss probability requirements, and said bandwidth provisioning requirements, thus allowing the switch to enforce the traffic constraint envelope for each flow.

15. The switch of claim 14, wherein said data network defines an avionics data network.

16. The switch of claim 14, wherein said data network defines an Avionics Full-Duplex Switched Ethernet (AFDX).

17. The switch of claim 14, wherein said 'per flow' traffic shaping function comprises a token bucket process.

18. The switch of claim 17, wherein said eligibility time computation mechanism determines the moment in time at which arriving frames will be conformant in accordance with said token bucket process.

19. A method for routing data flow in a data network of a type having a plurality of end systems, a plurality of line data buses connected to the end systems, and a plurality of switches connected to said line data buses and to other switches via trunk data buses to define a star topology, the switches and end systems configured to operate asynchronously, comprising utilizing switches which are each configured to operate by the steps of:
   a) receiving arrival data flows, via a plurality of switch ingress ports each arrival data flow having delay and delay-jitter bound requirements, frame loss probability requirements, and bandwidth provisioning requirements;
   b) monitoring the arrival data on each flow in defined traffic constraint envelopes containing frames, utilizing a 'per flow' flow monitor operatively associated with each said flow;
   c) computing an eligibility time at which arriving frames on each flow will be conformant to said defined traffic constraint envelope given past frame arrivals on that same flow, utilizing an eligibility time computation mechanism;
   d) holding said arriving frames on each flow until the eligibility time is reached utilizing a holding mechanism; and,
   e) releasing the arriving frames on a flow at the eligibility time utilizing a release mechanism,
   wherein said 'per flow' flow monitor, said eligibility time computation mechanism, said holding mechanism, and said release mechanism cooperate to provide a 'per flow' traffic shaping function in conformance with said delay and delay-jitter bound requirements, said frame loss probability requirements, and said bandwidth provisioning requirements, thus allowing the switch to enforce the traffic constraint envelope for each flow.

20. The method of claim 19, wherein said plurality of switches are connected to said line data buses and to other switches via trunk data buses to define an avionics data network.

* * * * *